US008216051B2

(12) United States Patent
Rasmussen

(10) Patent No.: US 8,216,051 B2
(45) Date of Patent: Jul. 10, 2012

(54) SLOT MACHINE WITH ALTERABLE REEL SYMBOLS

(75) Inventor: James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1005 days.

(21) Appl. No.: 11/990,684

(22) PCT Filed: Oct. 23, 2006

(86) PCT No.: PCT/US2006/041311

§ 371 (c)(1),
(2), (4) Date: Feb. 19, 2008

(87) PCT Pub. No.: WO2007/053349

PCT Pub. Date: May 10, 2007

(65) Prior Publication Data

US 2009/0227357 A1 Sep. 10, 2009

Related U.S. Application Data

(60) Provisional application No. 60/731,974, filed on Oct. 31, 2005.

(51) Int. Cl.
*A63F 13/00* (2006.01)

(52) U.S. Cl. ................ 463/20; 463/16; 463/19; 463/25; 463/30; 463/31; 273/138.12; 273/138.2; 273/141 R

(58) Field of Classification Search ............. 463/16–21, 463/25, 30–34; 273/138.1, 138.2, 141 R, 273/141 A, 143 A
See application file for complete search history.

(56) References Cited

U.S. PATENT DOCUMENTS 4,448,419 A 5/1984 Telnaes .................... 273/143 R
4,454,670 A 6/1984 Bachmann et al. ............. 40/584
4,517,558 A 5/1985 Davids .......................... 340/700
(Continued)

FOREIGN PATENT DOCUMENTS

EP 0 789 338 A1 8/1997
(Continued)

OTHER PUBLICATIONS

Written Opinion corresponding to International Patent Application No. PCT/US2006/041311, U.S. Patent Office, dated Mar. 17, 2007, 5 pages.

(Continued)

*Primary Examiner* — Sunit Pandya
(74) *Attorney, Agent, or Firm* — Nixon Peabody LLP

(57) ABSTRACT

A mechanical reel system with alterable reel symbols. Pivoting reel symbol members are provided at predetermined locations about a reel, each member having two, three, or six sides, for example. On each surface, a different symbol (or a blank symbol) is disposed thereon. A transmissive LCD is positioned over the reels, and when the reels display blanks, images are displayed on the LCD over the blanked area(s) during, e.g., a video bonus game played on the LCD. The symbol members can be altered within a game to display a different set of symbols on the reels, or they can be altered to convert the game from one theme to another. In another embodiment, a bellow-like reel strip, which is folded accordion-style, is retracted or extended relative to the periphery of the reel, allowing a symbol set or subset to replace a corresponding symbol (sub)set displayed on the underlying reel.

2 Claims, 10 Drawing Sheets

U.S. PATENT DOCUMENTS

| | | | | |
|---|---|---|---|---|
| 4,718,672 | A | 1/1988 | Okada | 273/143 R |
| 4,875,144 | A | 10/1989 | Wainwright | 362/103 |
| 5,152,529 | A | 10/1992 | Okada | 273/143 R |
| 5,375,043 | A | 12/1994 | Tokunaga | 362/31 |
| 5,395,111 | A | 3/1995 | Inoue | 273/143 R |
| RE35,188 | E | 3/1996 | Howard | 273/143 R |
| 5,580,055 | A | 12/1996 | Hagiwara | 273/143 R |
| 5,725,210 | A | 3/1998 | Yamaguchi et al. | 273/121 B |
| 5,752,881 | A | 5/1998 | Inoue | 463/20 |
| 5,873,645 | A | 2/1999 | Belfer | 362/32 |
| 5,934,672 | A | 8/1999 | Sines et al. | 273/143 R |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,068,552 | A | 5/2000 | Walker et al. | 463/21 |
| 6,086,066 | A * | 7/2000 | Takeuchi et al. | 273/143 R |
| 6,135,884 | A | 10/2000 | Hedrick et al. | 463/20 |
| 6,164,645 | A | 12/2000 | Weiss | 273/138.2 |
| 6,368,216 | B1 | 4/2002 | Hedrick et al. | 463/20 |
| 6,471,387 | B1 | 10/2002 | Henshaw et al. | 362/555 |
| 6,497,617 | B1 | 12/2002 | Yoshida | 463/20 |
| 6,517,433 | B2 | 2/2003 | Loose et al. | 463/20 |
| 6,722,979 | B2 | 4/2004 | Gilmore et al. | 463/20 |
| 6,726,204 | B2 | 4/2004 | Inoue | 273/143 R |
| 6,923,441 | B2 | 8/2005 | Inoue | 273/143 |
| 7,160,187 | B2 | 1/2007 | Loose et al. | 463/20 |
| 7,166,029 | B2 | 1/2007 | Enzminger | 463/20 |
| 7,473,173 | B2 | 1/2009 | Peterson et al. | 463/20 |
| 7,753,773 | B2 | 7/2010 | Baerlocher et al. | 463/20 |
| 2002/0173354 | A1 | 11/2002 | Winans et al. | 463/20 |
| 2002/0183109 | A1 | 12/2002 | McGahn et al. | 463/20 |
| 2003/0060269 | A1 | 3/2003 | Paulsen et al. | 463/20 |
| 2003/0157980 | A1 | 8/2003 | Loose et al. | 463/20 |
| 2004/0029636 | A1 | 2/2004 | Wells | 463/32 |
| 2004/0192430 | A1 | 9/2004 | Burak et al. | 463/20 |
| 2004/0198485 | A1 | 10/2004 | Loose et al. | 463/20 |
| 2004/0266515 | A1 | 12/2004 | Gauselmann | 463/20 |
| 2005/0140088 | A1 | 6/2005 | Randall | 273/143 R |
| 2005/0153775 | A1 | 7/2005 | Griswold et al. | 463/30 |
| 2005/0255908 | A1 | 11/2005 | Wells | 463/20 |
| 2006/0014580 | A1 | 1/2006 | Hawthorn | 463/20 |
| 2006/0084498 | A1 | 4/2006 | Baerlocher et al. | 463/20 |
| 2006/0135245 | A1 | 6/2006 | Hedrick et al. | 463/19 |
| 2006/0135248 | A1 | 6/2006 | Anderson et al. | 463/22 |
| 2006/0281530 | A1 | 12/2006 | Seelig et al. | 463/20 |
| 2007/0004513 | A1 | 1/2007 | Wells et al. | 463/31 |
| 2007/0010318 | A1 | 1/2007 | Rigsby et al. | 463/20 |
| 2007/0054730 | A1 | 3/2007 | Mattice et al. | 463/16 |
| 2007/0077986 | A1 | 4/2007 | Loose et al. | 463/20 |
| 2007/0149281 | A1 | 6/2007 | Gadda et al. | 463/34 |
| 2007/0228651 | A1 | 10/2007 | Loose et al. | 273/143 R |

FOREIGN PATENT DOCUMENTS

| | | | |
|---|---|---|---|
| EP | 0 989 531 | A2 | 3/2000 |
| GB | 2 124 505 | | 2/1984 |
| GB | 2165074 | A | 4/1986 |
| GB | 2 253 299 | A | 2/1992 |
| GB | 2 349 494 | A | 11/2000 |
| JP | 10-071228 | | 3/1998 |
| JP | 2000-262738 | | 9/2000 |
| JP | 2002-113150 | | 4/2002 |
| JP | 2002-279964 | | 9/2002 |
| WO | WO 99/53454 | A1 | 10/1999 |
| WO | WO 2006/028699 | A2 | 3/2006 |
| WO | WO 2006/028860 | A2 | 3/2006 |
| WO | WO 2006/039371 | A2 | 4/2006 |
| WO | WO 2007/005846 | A2 | 1/2007 |
| WO | WO 2007/030781 | A2 | 3/2007 |

OTHER PUBLICATIONS

International Search Report corresponding to International Patent Application No. PCT/US2006/041311, U.S. Patent Office, dated Mar. 17, 2006, 2 pages.

Brochure for "3RV," WMS Gaming Inc., Waukegan, IL, 2 pages, undated.

Article for "The Pink Panther," *Strictly Slots*, p. 50, dated Feb. 2001.

Article for "Flip Flop," *Strictly Slots*, p. 48, dated Jun. 2000.

* cited by examiner

SLOT MACHINE WITH ALTERABLE REEL SYMBOLS

CROSS-REFERENCE TO RELATED APPLICATIONS

This application is a U.S. National Stage of International Application No. PCT/US2006/041311, filed Oct. 23, 2006, which claims the benefit of U.S. Provisional Application No. 60/731,974 filed on Oct. 31, 2005, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and more particularly, to a gaming machine with alterable reel symbols.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Gaming machines have utilized a variety of mechanisms to present various combinations of symbols, and to award prizes, money, or other awards associated with certain predefined winning combinations. Traditional slot machines, for example, utilize a plurality of reels (either mechanical, or simulated on a video display) and at least one payline, with certain combination of symbols landing on the payline constituting winning combinations for which awards are given to the player in accordance with a pay table.

An advantage slot machines with video displays over slot machines with mechanical reels is that the former can automatically alter the symbols displayed on the virtual reels shown on the video display, facilitating game theme changes and enhanced game features such as bonus games. Many players, however, prefer to play the mechanical slot machines, however, these machines have traditionally not been capable of altering a reel symbol during operation of the slot machine. To do so, an operator must disassemble the slot machine and replace the existing reels strips with different reel strips bearing different symbol combinations. This process is time- and labor-consuming and expensive.

Thus, a need exists for an improved apparatus and method. The present invention is directed to satisfying one or more of these needs and solving other problems.

SUMMARY OF THE INVENTION

According to one aspect of the present invention, a gaming machine for conducting a wagering game includes a reel including a reel symbol. At least part of the reel symbol is disposed on a first of at least two sides of a rotatable structure coupled to the reel. The gaming machine further can include a controller programmed to randomly select a game outcome in response to receiving a wager from a player and to rotate the reel to display a part of the game outcome. In some aspects, the rotatable structure, which may be made from a material that is generally semi-translucent, has a triangular cross-section and exactly three sides. In other aspects, the rotatable structure is coupled to a gear assembly, which in turn is coupled to a motor that drives the gear assembly under control of a controller. The gaming machine can further include a source of light, such as a light pipe, that radiates light through the rotatable structure so as to illuminate it. An optional transmissive LCD overlays the reel. The reel may further include a second reel symbol, at least part of which is disposed on a first of at least two sides of a second rotatable structure also coupled to the reel. The rotatable structures can rotate independently of one another or together. In some aspects, the rotatable structure is pivotally coupled to the reel and the entirety of the reel symbol is disposed on the first side of the rotatable structure, which can have six sides.

According to another aspect of the present invention, a gaming machine for conducting a wagering game includes a reel and a retractable structure disposed about at least a part of an outer periphery of the reel. The retractable structure has a set of reel symbols that is displayed to a player of the gaming machine when the retractable structure is extended across the outer periphery. In some aspects, the gaming machine further includes a second retractable structure disposed about at least part of an outer periphery of the reel. The second retractable structure has a second set of symbols that is displayed to a player when the second retractable structure is extended across the outer periphery.

According to a still further aspect of the present invention, a method of altering a reel symbol in a gaming machine includes automatically altering a reel symbol on a reel from a first reel symbol to a second reel symbol without rotating the reel. At least part of the first reel symbol and at least part of the second reel symbol may be disposed on different sides of a multi-sided structure having two or more surfaces. The altering can include rotating the multi-sided structure such that the second reel symbol is displayed to a player of the gaming machine. The method in other aspects may further include illuminating the multi-sided structure from an end thereof. In still further aspects, the method may further include displaying on a transmissive LCD that overlays the reel a reel symbol image. The first reel or second reel symbols can be blank.

According to yet another aspect of the present invention, a method of altering a set of symbols on a gaming machine includes providing an inner reel concentric with an outer reel. The outer reel has a plurality of openings through which a first set of reel symbols on the inner reel are visible. The method further includes receiving a wager to play a wagering game on the gaming machine. Before receiving the wager, the inner reel or outer reel is rotated relative to one another to cause a second set of reel symbols to be visible through the plurality of openings. The first and second sets of reel symbols include a subset of all of the reel symbols disposed on the inner reel. The method further includes randomly selecting an outcome of the wagering game, spinning the inner reel and the outer reel together, and stopping the inner reel and the outer reel together at a position representing at least part of the randomly selected outcome. The method can further include displaying a reel symbol image on a transmissive LCD that overlays the outer reel.

Additional aspects of the invention will be apparent to those of ordinary skill in the art in view of the detailed description of various embodiments, which is made with reference to the drawings, a brief description of which is provided below.

DETAILED DESCRIPTION

Figure 1:
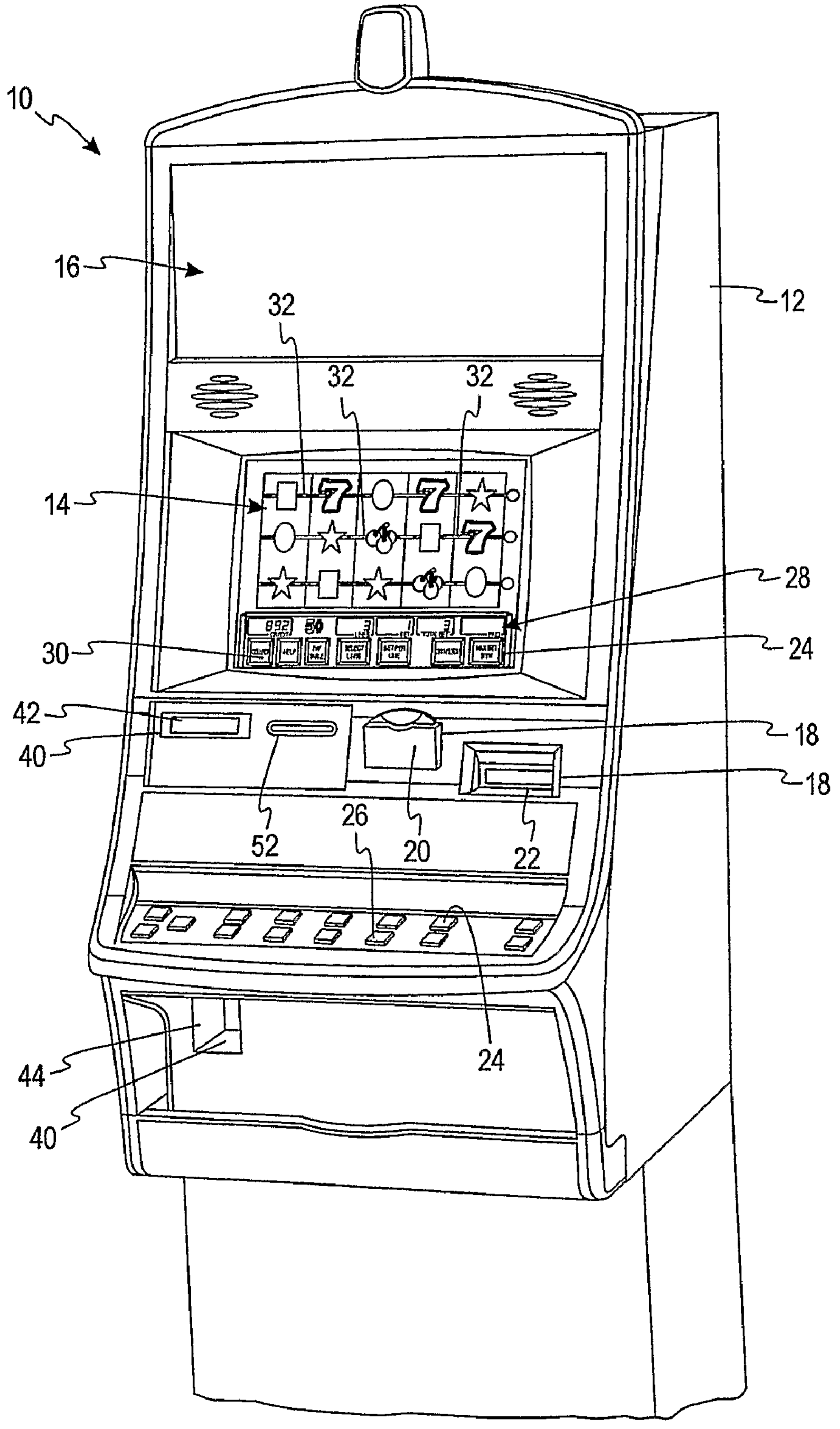
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
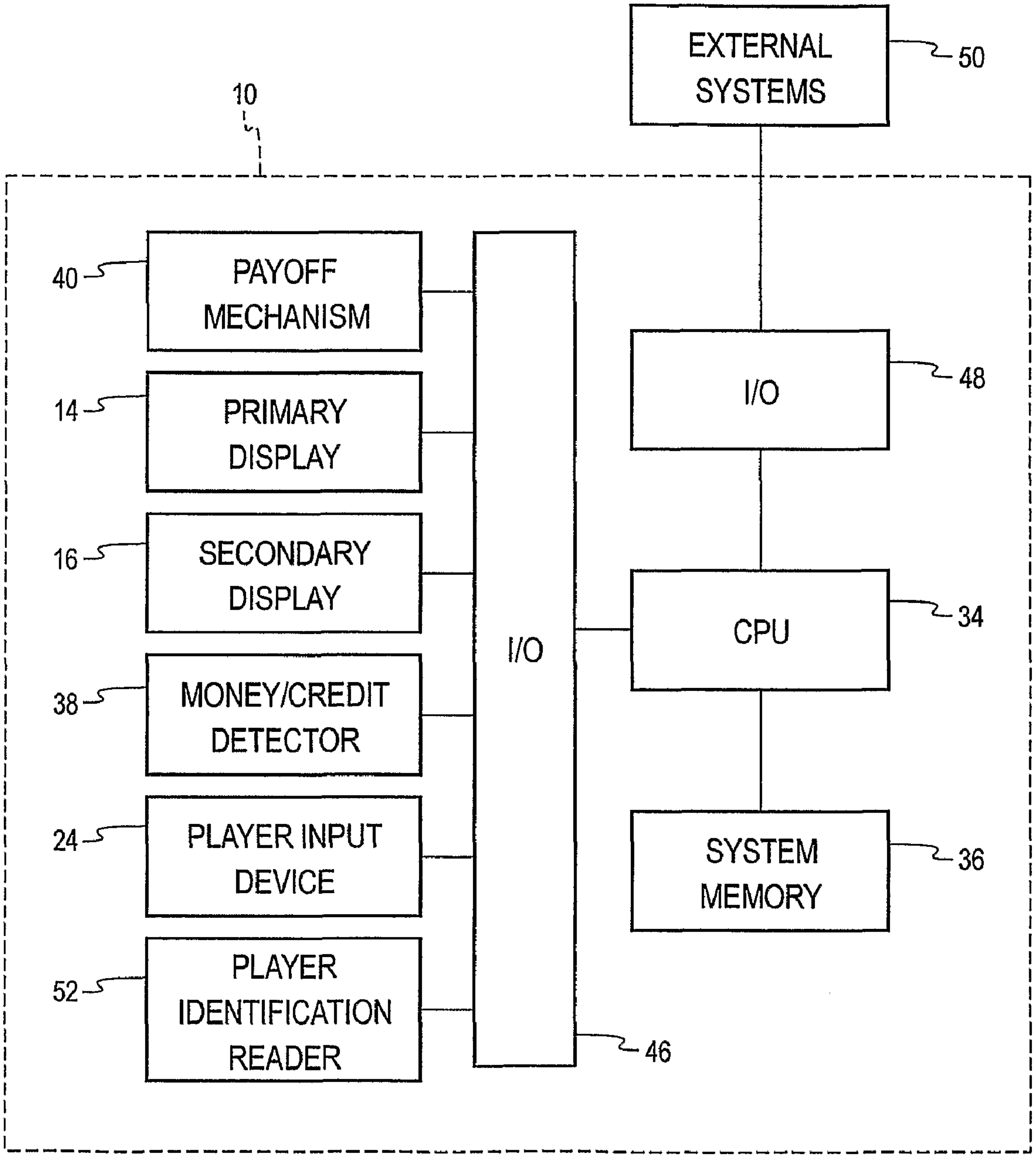
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

As mentioned above, the gaming machine 10 may be an electromechanical gaming machine configured to play mechanical slots. The primary display 14 includes a number of mechanical reels to display the outcome, and these mechanical reels conventionally include a reel drum or cage about which a reel strip bearing artwork (i.e., symbols) is wound. If the gaming machine 10 includes three reels, then there are three such reel strips wound around three separate reel cages. For five reels, five strips are required, and so on. The present invention pertains, inter alia, to the manner in which the reel strip is attached to the reel cage.

Figure 3A:
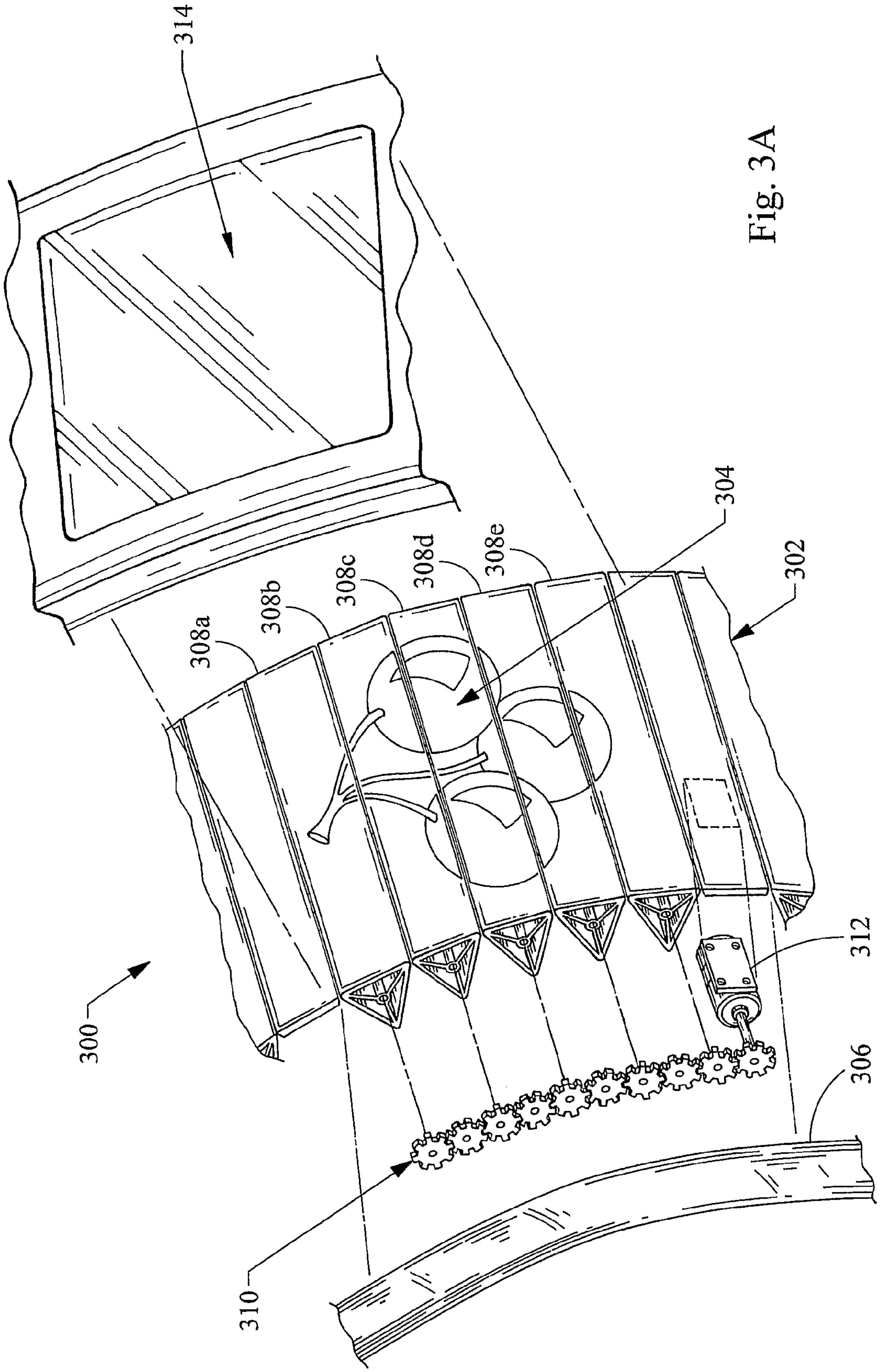
FIG. 3A is a perspective view of an alterable reel system with individually pivoting segments in accordance with a specific aspect of the present invention.

Turning now to FIG. 3A, an alterable reel strip system 300 according to an embodiment of the present invention is shown. The alterable reel strip system 300 effectively provides three sets of reel symbols on one mechanical reel. A portion of a reel 302 is shown with five individually pivoting segments 308*a,b,c,d,e*, each having a generally triangular cross-section. On each side of each pivoting segment 308, there is disposed part or all of a symbol 304. As shown, part of a "cherry" symbol 304 is disposed on each of the five pivoting segments 308.

The pivoting segments 308 are rotatably driven by a bidirectional motor 312 that is connected to a plurality of interlocked gears 310. Activating the motor 312 will cause the gears to rotate, which in turn, cause the individually pivoting segments 308 to rotate. In the case of triangular-shaped segments, each 120 degree rotation results in a new face of the segment being presented to the player. The other two faces remain hidden from view.

Although only part of the reel 302 is shown in FIG. 3A, it is contemplated that all or some of the symbols disposed on the reel 302 can be fixed (i.e., cannot be altered) or variable (can be altered in accordance with the present invention). In an embodiment, the motor 312 drives all gears connecting the pivoting segments, including pivoting segments 308, about the reel 302, causing all pivoting segments to be rotated together. In another embodiment, multiple motors are provided to selectively and independently rotate certain pivoting segments at a time. In this respect, the present invention contemplates individual, partial, and full-reel symbol position control.

Figure 3B:
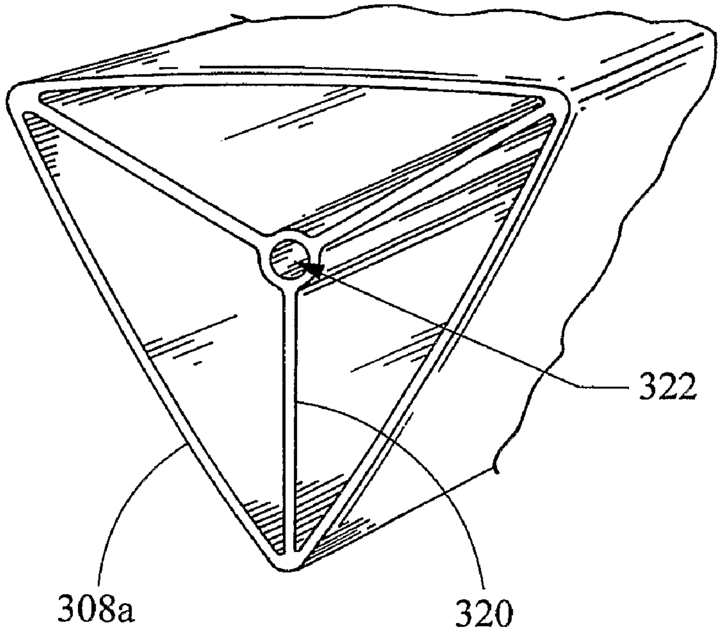
FIG. 3B is an end view of one of the pivoting segments shown in FIG. 3A according to an aspect of the present invention.

A fixed light source 306 is disposed about an end of the pivoting segments 308, such that the light source 306 rotates with the reel 302. In the embodiment illustrated in FIG. 3A, the light source 306 is a light pipe. In other embodiments, the light source 306 may be an LED source, an incandescent source, or a fiber optic source, for example. The light source 306 radiates light through the end of the pivoting segment 308*a* (FIG. 3B), such that the pivoting segment 308*a* illuminates the symbol 304 to the player. The pivoting segments 308 are formed from a translucent white extrusion for diffusing the light from the light source 306 across the length of each pivoting segment 308. A frame 320 provides rigidity to each pivoting segment 308, as shown in FIG. 3B, and also includes a centrally located aperture 322 for receiving the gear 310.

Figure 3C:
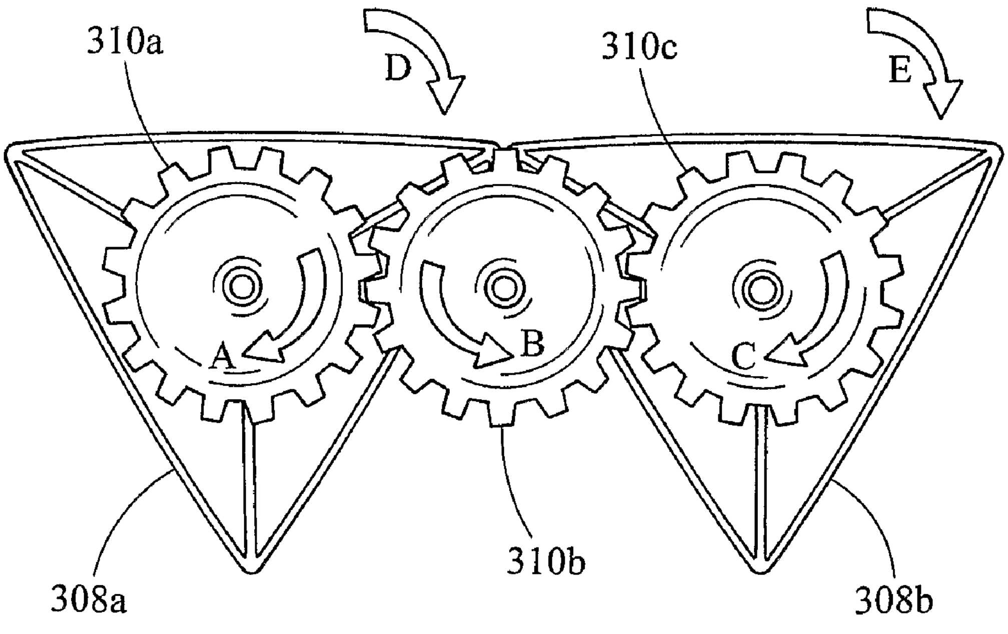
FIG. 3C is an end view of a pair of pivoting segments shown in FIG. 3A interconnected by gears according to an aspect of the present invention.

In FIG. 3C, three gears 310*a,b,c* are shown interlocked with one another and coupled to two pivoting segments 308*a, b*. Rotation by the motor 312 of the gear 310*c* in a clockwise direction C causes the gear 310*c* to rotate the gear 310*b* in a counterclockwise direction B, which in turn causes the gear 310*a* to rotate in a clockwise direction A. Simultaneously, the pivoting segment 308*b* is rotated clockwise along with the pivoting segment 308*a* in directions E and D, respectively. The gears 310 or the pivoting segments 308 may include self-locking detents to resist non-actuated rotation. To expose each surface of a pivoting segment 308, each pivoting segment must be rotated 120 degrees. The detents can provide feedback to the motor 312 that the pivoting segment is in a proper position.

In a specific embodiment, the respective apertures representing the respective centers of the pivoting segments 308*a,b* are 0.2875 inches apart, and the gear 310*b* has a diameter of 0.13925 inches. These dimensions are purely exemplary.

An optional transmissive LCD 314 is disposed over the pivoting segments 308. The light radiated by the illumination of the pivoting segments 308 by the light source 306 propagates through the transmissive LCD 314 to render images or graphics displayed on the transmissive LCD 314 visible to the player. For example, in embodiments where the pivoting segments 308 are blank symbols (e.g., a white translucent appearance), the pivoting segments 308 provide the illumination to the transmissive LCD 314, allowing any symbol or graphic to be displayed on the transmissive LCD 314. In this way, the transmissive LCD 314 can transition from a primary to a bonus game, blank a symbol, or fill a blank. The flexibility offered by the video-type display 314 permits the odds of winning to be increased or decreased within a game or across game theme changes. Furthermore, by allowing a symbol to be blanked on a mechanical reel, the present invention provides the gaming machine manufacturer with enhanced flexibility in designing wagering games featuring mechanical reels. The alterability of the symbols on the mechanical reel in accordance with the present invention increases the excitement value to the player, thereby enhancing player interest in playing the game. A transmissive LCD appropriate for use with the present invention is commercially available from LG Philips LCD Co., Ltd. Additional advantages of the "blanking" embodiments of the present invention are discussed below in connection with FIG. 7B.

Figure 4A:
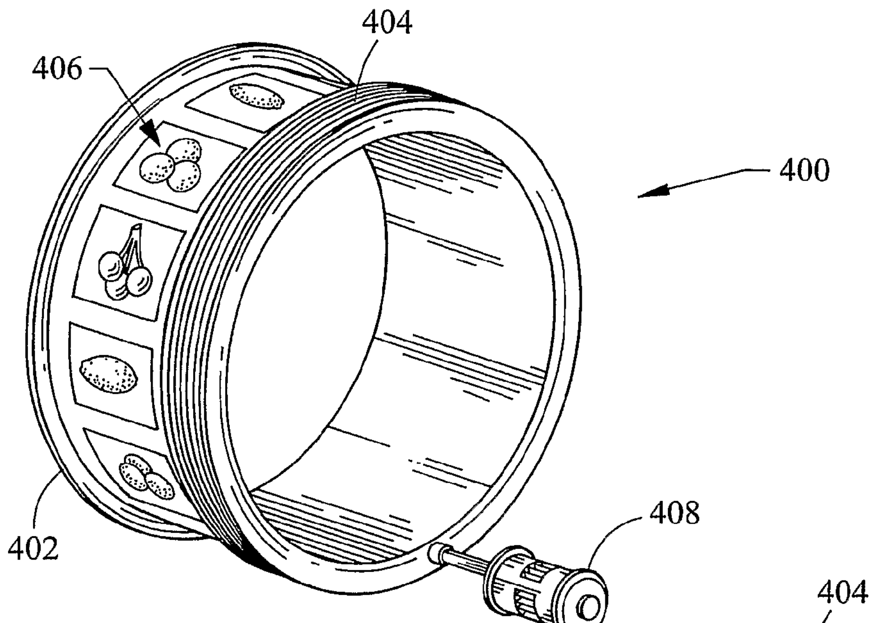
FIGS. 4A-4C are perspective views of a dual-stage reel strip-system in various stages of conversion according to an aspect of the present invention.
Figure 4B:
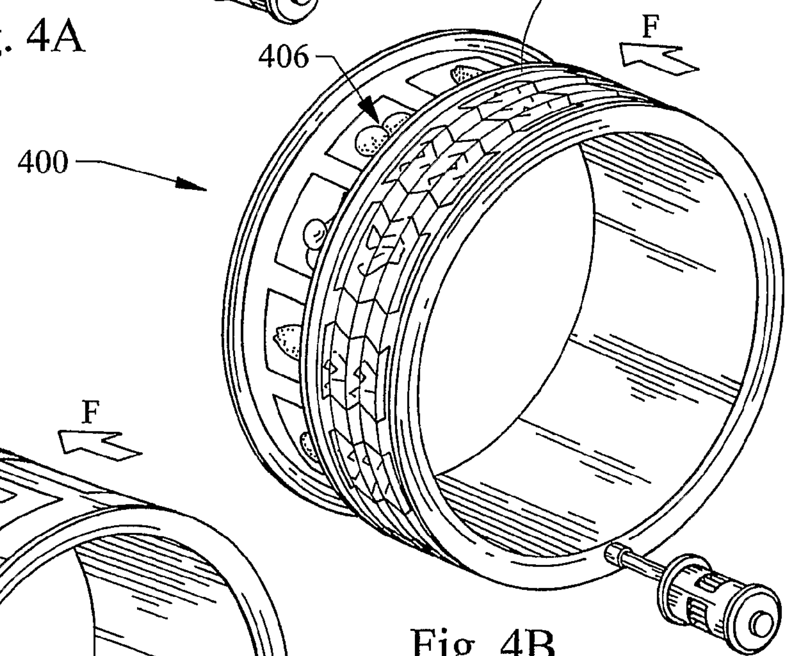
Figure 4C:
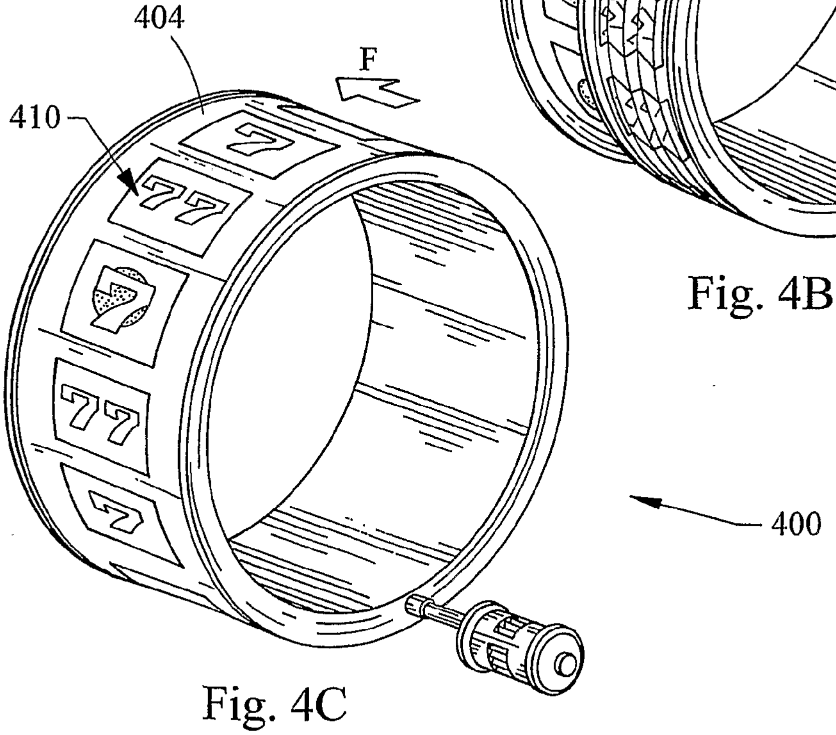

Turning now to FIGS. 4A-4C, a dual-stage reel-strip system 400 is shown in which a secondary reel strip 404 is folded and retracted along a periphery of a reel 402 bearing a first set of reel symbols 406. The secondary reel strip 404 is preferably accordion folded so that when retracted it remains compact and substantially hidden from the player. An actuator 408 causes the secondary reel strip 404 to extend or retract relative to the reel 402. The actuator 408 can be actuated by air (pneumatic), a vacuum, a mechanical linkage, or a screw drive, for example. As shown in FIG. 4A, the actuator 408 is actuated by drawing or releasing air into the secondary reel strip 404, similar to a bellows apparatus. When air is released into the secondary reel strip 404, it forces the expansion of the folded sections across the outer surface of the reel 402 in the direction of arrow F until the secondary reel strip 404 is fully extended thereacross (FIG. 4C). In the fully extended position when conversion actuation is complete, the secondary reel strip 404 displays a second set of reel symbols 410.

In the embodiment shown in FIGS. 4A-4C, two different sets of reel symbols 406, 410 are selectable under programmed control of the controller 34. In other embodiments, the secondary reel strip 404 does not extend around the entire periphery of the reel 402, but only a portion thereof. In these other embodiments, selected one or ones of the first set of reel symbols 406 can be altered by extending over them a segmented secondary reel strip.

Figure 5A:
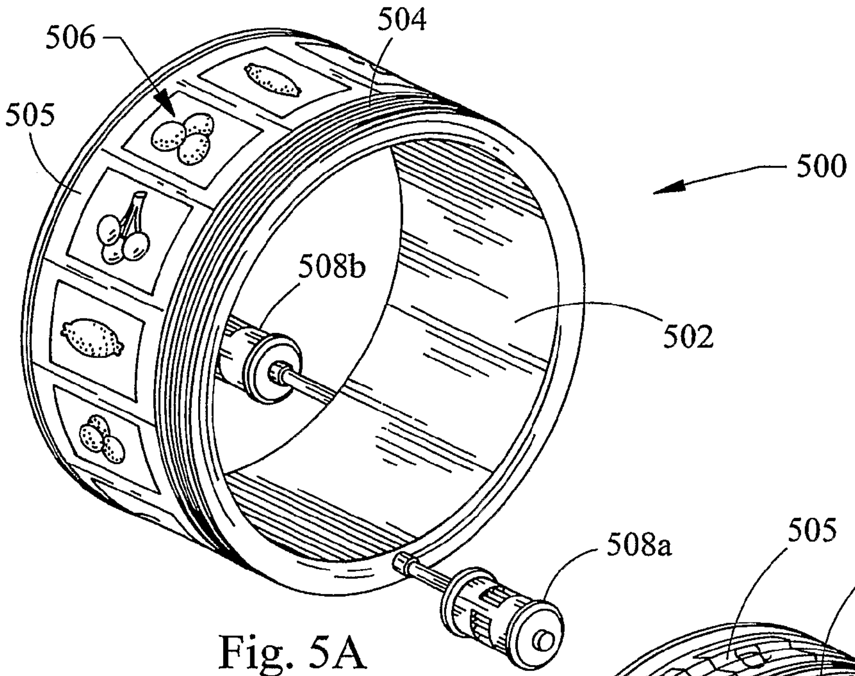
FIGS. 5A-5C are perspective views of another dual-stage reel-strip system in various stages of conversion according to another aspect of the present invention.
Figure 5B:
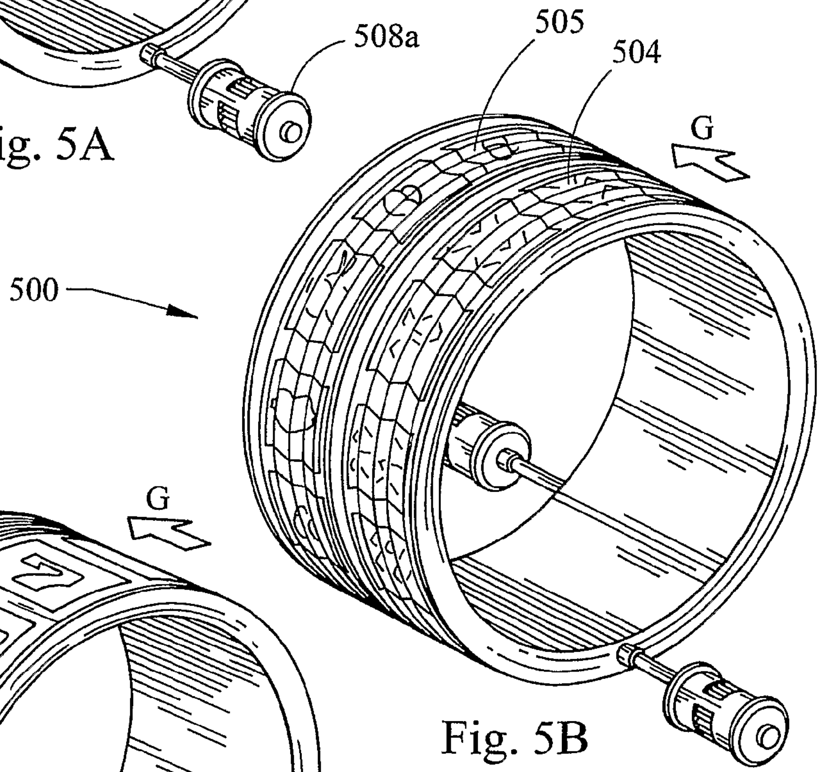
Figure 5C:
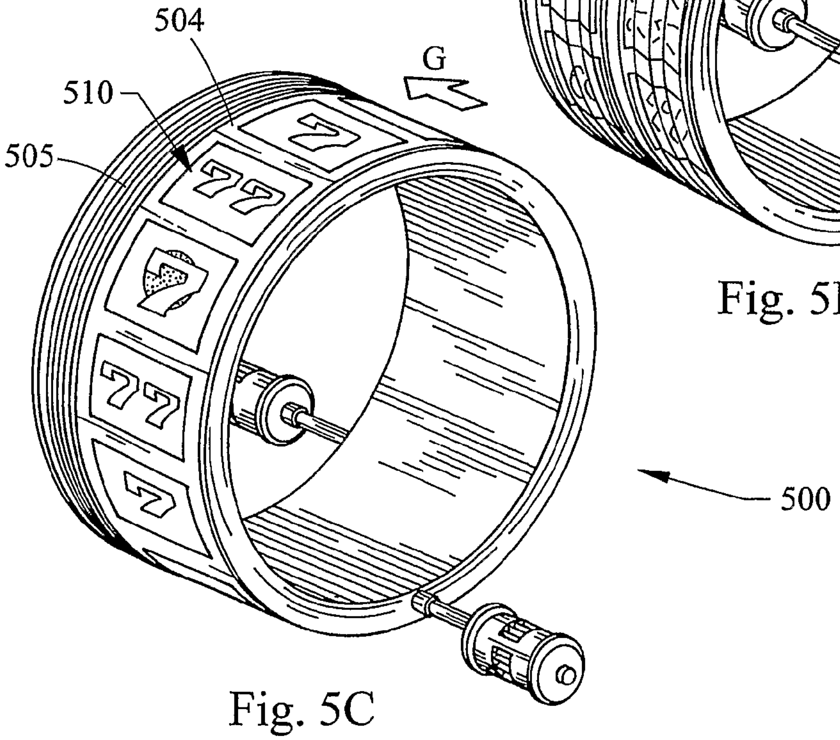

The embodiment shown in FIGS. 5A-5C illustrates a dual-stage reel-strip system 500 including two bidirectional bellow-like strips instead of one as shown in FIGS. 4A-4C. A reel 502 has disposed about its outer periphery a first reel strip 504 and a second reel strip 505. Both reel strips 504, 505 are folded like an accordion and resemble a bellows apparatus, permitting air drawn into or released from the reel strips 504, 505 by respective actuators 508*a,b* to cause each strip to retract or expand. As with the embodiment shown in FIGS. 4A-4C, the actuators 508*a,b* can be actuated by air (pneumatic), a vacuum, a mechanical linkage, or a screw drive, for example, under programmed control of the controller 34.

In FIG. 5A, the first reel strip 504 is fully retracted, exposing a second set of reel symbols 506 on the second reel strip 505 to the player. The actuator 508*a* forces air into the first reel strip 504 while the actuator 508*b* draws air out of the second reel strip 505, causing the first reel strip 504 to begin to extend across the reel 502 in the direction of arrow G while the second reel strip 505 begins to retract toward the edge of the reel 502. When fully retracted, the second reel strip 505 is folded along the edge of the reel 502 as shown in FIG. 5C, and a first set of reel symbols 510 disposed on the now exposed first reel strip 504 is displayed to the player. Although the first and second reel strips 504, 505 are shown extending around the entire reel 502, in other embodiments, they may extend around only part of the reel 502 to permit individual symbol changes or changes to groupings of symbols.

Figure 6:
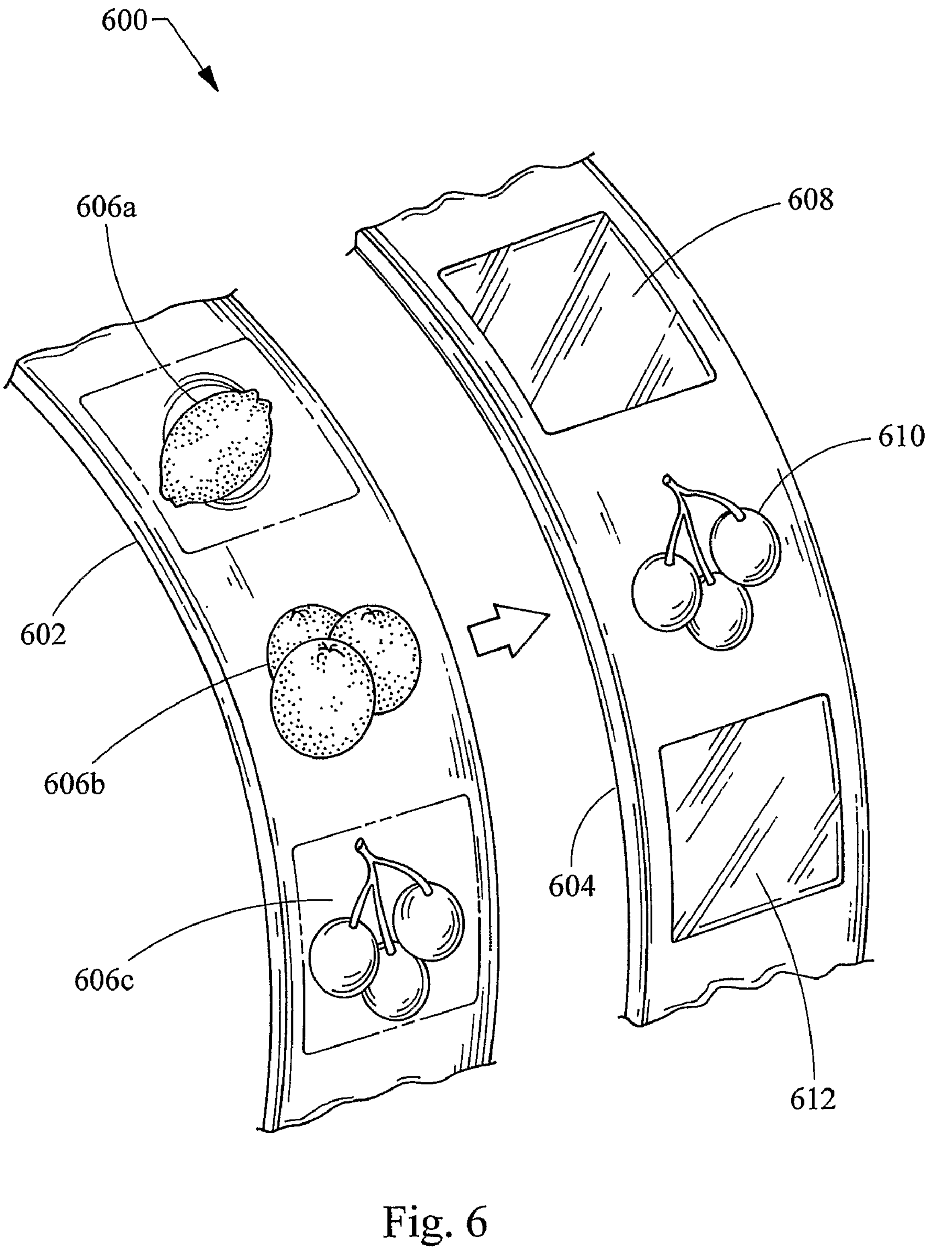
FIG. 6 is a perspective view of a multi-purpose reel system according to an aspect of the present invention.

Turning now to FIG. 6, a multi-purpose reel system 600 is shown having an inner reel 602 and an outer reel 604, which are co-axial and fixed together for rotation. During rotation, both the inner reel 602 and the outer reel 604 spin together and do not spin independently of one another. Before rotation, the reels 602, 604 can be counter-rotated one or more symbol positions as described below in order to alter the reel symbol set displayed to the player.

Symbols 606*a,b,c* and 610 are shown on the inner and outer reels 602, 604 for ease of discussion, however, in various embodiments, some or all of these symbols may be present and others may be blank. The outer reel 604 includes windows 608, 612 at every other symbol position about the periphery of the outer reel 604. The windows 608, 612 may be openings or may include a transparent material to permit symbols on the inner reel 604 to be visible therethrough. Ali optional transmissive LCD may be positioned over (i.e., in front of) the windows 608, 612 to display images thereover. When the underlying symbols 6066*a,c* are blanked and backlit, the radiating light illuminates the transmissive LCD to render the image(s) displayed thereon visible to the player.

In an embodiment, a window blocking mode involves no symbols on the outer reel 604 (i.e., symbol 610 is blank) and only symbols 606*a,c* (i.e., symbol 606*b* is blank). Symbol 606*a* on inner reel 604 is visible through the window 608 and symbol 606*c* is visible through the window 612. During game play, the inner and outer reels 602, 604 spin together and stop to display the symbols 606*a,c* through the windows 608, 612, respectively.

In another mode, before game play, the inner and outer reels 602, 604 are counter-rotated relative to one another by one or more symbol positions. For example, counter-rotation of the inner reel 602 by one position would cause the symbols 606*a,c* to "disappear" behind the non-windowed areas of the outer reel 604. Symbol 606*b* would then be visible through either the window 608 or the window 612 depending on the direction of rotation. Alternately, if the symbol 606*b* is a blank symbol, the counter-rotation would cause the window 608 or the window 612 on the outer reel 604 to show a "blank" symbol. A graphic or image representing a reel symbol, for example, can be displayed on the transmissive LCD positioned over the symbol 606*b* or that symbol position can remain blank.

Figure 7B:
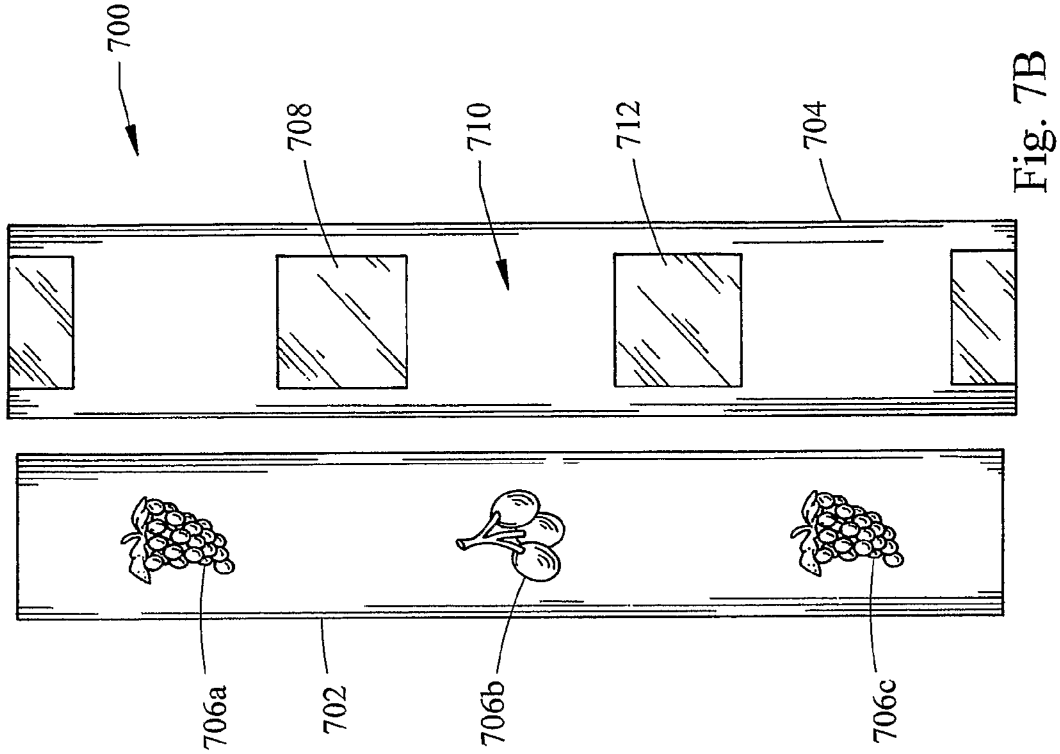
FIGS. 7A-7B are flattened top views of inner and outer reels of a multi-purpose reel system according to an aspect of the present invention.
Figure 7A:
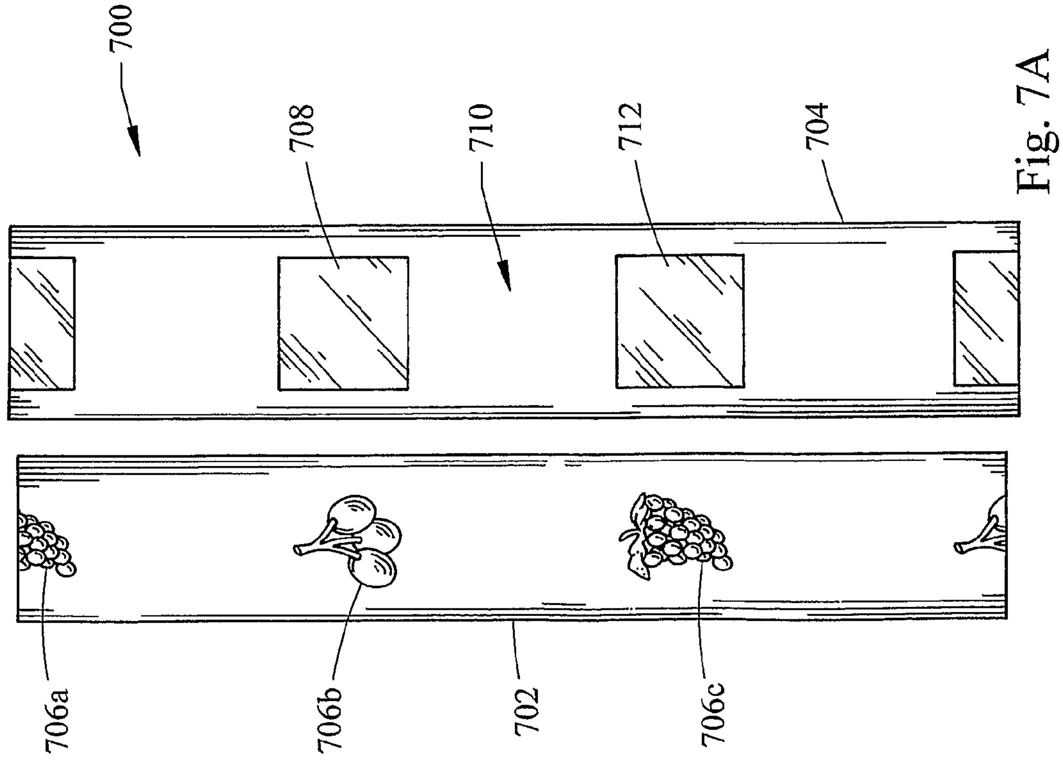

In FIGS. 7A-7D, similar embodiments to those shown in FIG. 6 are shown. In FIG. 7A, a multi-purpose reel system 700 is shown including an inner reel 702 and an outer reel 704, which are shown stretched out flat rather than curved for ease of discussion. The inner reel 702 includes reel symbols 706*a,b,c* and the outer reel 704 includes windows 708 and 712 on either side of a blank symbol 710. During game play, the inner and outer reels 702, 704 spin together and when they stop, symbols 706*b,c* are visible through the windows 708, 712, respectively. As with the embodiment described in shown in connection with FIG. 6, the windows 708, 712 may be covered by a transmissive LCD on which images or graphics representing a reel symbol, for example, can be displayed under programmed control of the controller 34.

In the "window block" mode shown in FIG. 7B, the inner reel 702 is counter-rotated before game play relative to the outer reel 704 by one symbol position. The blanks between the symbols 706*a* and 706*b* and between symbols 706*b* and 706*c* are displayed through the windows 708, 712, respectively. The blank symbol 710 conceals from view the symbol 706*b* on the inner reel 702. Thus, what the player perceives in FIG. 7B is a blank reel. A transmissive LCD positioned over the windows 708, 712 may display an optional image or graphic representing a reel symbol, for example, taking advantage of the nostalgia associated with mechanical reels as well as the flexibility offered by electronic video-type displays. In an embodiment, the "window block" mode renders "blank" all reels (only one has been shown in the illustrated embodiments, but it is understood that typically more than one reel is used in a gaming machine, such as three or five) such that to the player, only white space is viewable through the transmissive LCD positioned over the reels.

When the reels are "blanked," the mechanical reel display area is essentially converted into a video-type display, and the illuminated white space under the transmissive LCD helps to accentuate and render visible to the player images and graphics displayed on the transmissive LCD during, for example, a video bonus game played on the transmissive LCD. The "blanking" of the underlying reels advantageously enables conversion of the mechanical reels into a video-type display, which provides the best of both worlds to a gaming designer. When the transmissive LCD is not needed, no images are displayed thereon, permitting the player to see the actual mechanical reels underneath the transmissive LCD through the transparent interface. When a video bonus game, for example, is triggered, the mechanical reels can be blanked in accordance with the present invention, and a video bonus game played on the transmissive LCD positioned over the reels. Illumination provided underneath the transmissive LCD allows the images displayed on the LCD to be seen by the player.

Figure 7D:
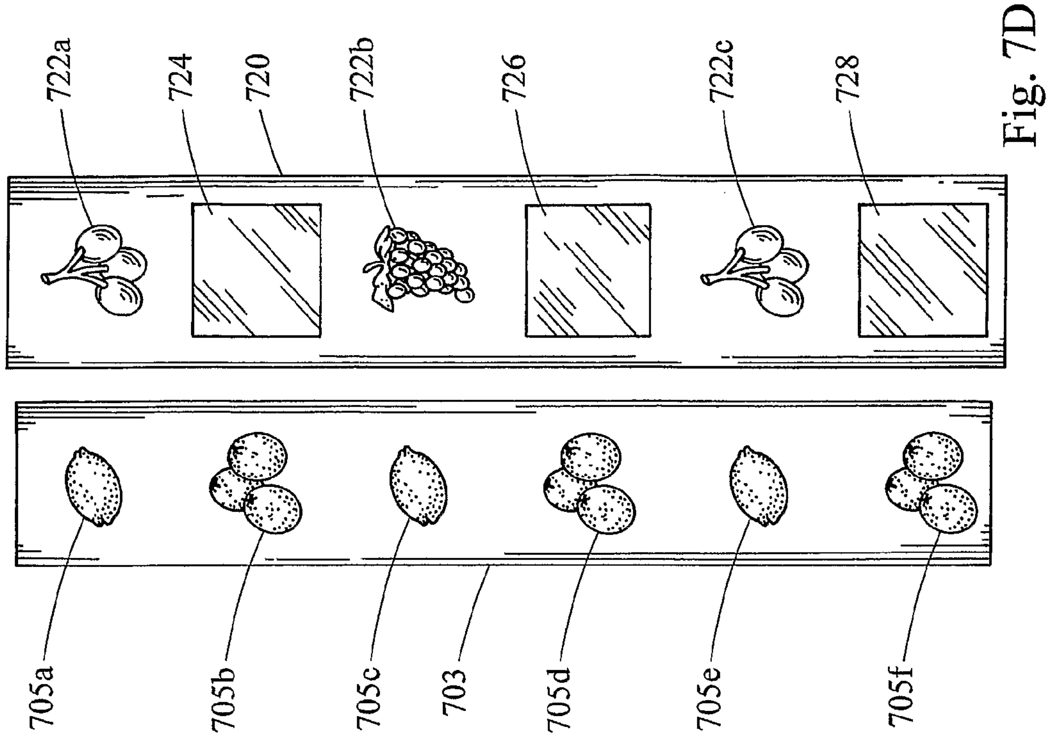
FIG. 7D is a flattened top view of inner and outer reels of a multi-purpose reel system according to yet another aspect of the present invention.
Figure 7C:
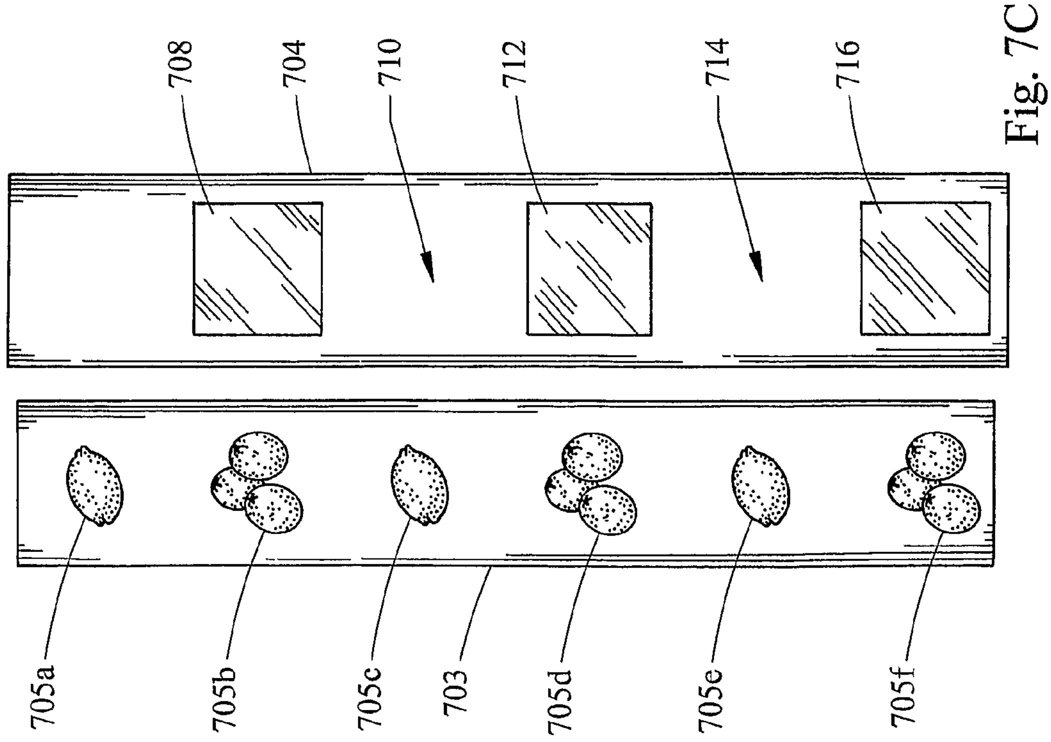
FIG. 7C is a flattened top view of inner and outer reels of a multi-purpose reel system according to another aspect of the present invention.

In FIG. 7C, reel symbols 705*a,b,c,d,e,f* on an inner reel 703 are present at every symbol location, so that no matter how many symbol positions the inner reel 703 is counter-rotated relative to the outer reel 704, a reel symbol is always present through the windows 708, 712, 716. The symbol blanks 710, 714 conceal every other reel symbol on the inner reel 703, such as the symbols 705*c,e* shown in FIG. 7C. Although two sets of reel symbols (the first set being represented by symbols 705*a,c,e* and the second set being represented by symbols 705*b,d,f*) are displayable through the windows of the outer reel 704, in other embodiments, any number of sets of reel symbols, such as three or four, are displayable by positioning the windows at every third, every fourth, and so forth, symbol location. The embodiments described in connection with FIG. 7C permit a full change of symbol sets by incremental rotation of the outer reel 704 relative to the inner reel 703.

In FIG. 7D, a subset of symbols can be changed instead of a full set as shown in FIG. 7C. A fixed subset of symbols, represented by 722*a,b,c*, are disposed on an outer reel 720, separated by windows 724, 726, 728. Two subsets of symbols are disposed on the inner reel 703 as in FIG. 7C. A first subset, viewable through the windows 724, 726, 728 as shown, is represented by reel symbols 705*b,d,e*, and a second subset, which is concealed from view, is represented by reel symbols 705*a,c,f*. To change from the first subset to the second subset, the outer reel 720 is rotated by one symbol position relative to the inner reel 703, resulting in only a partial change of symbol sets.

In all embodiments shown and described in connection with FIGS. 7A-7D, the various windows are positioned at regular locations about the periphery of the reel. However, the present invention also contemplates that the windows may be positioned at any location about any or all of the periphery of the reel. The rotation of the inner and outer reels and the operation of the transmissive LCD are under programmed control of the controller 34.

Figure 8B:
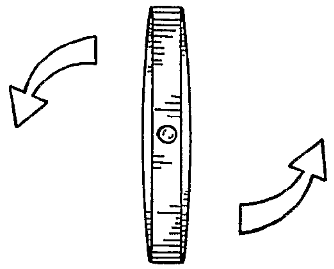
FIGS. 8A-8B are perspective illustrations of a reel system including pivotally mounted symbol members having different symbols disposed on each side of each symbol member in accordance with an aspect of the present invention.
Figure 8A:
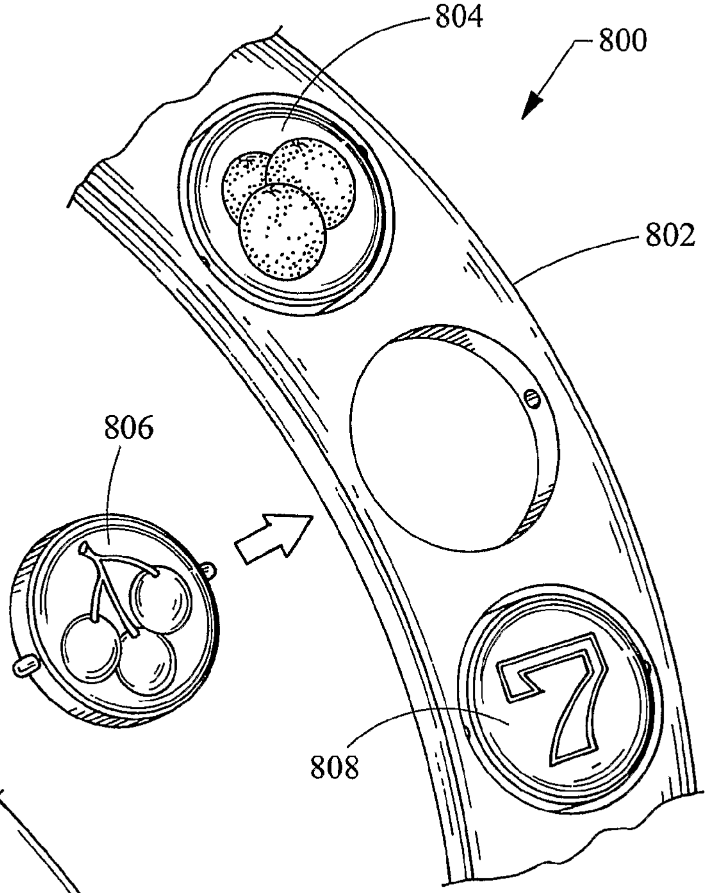

Turning now to FIGS. 8A-8B, an alterable reel system 800 is shown with symbol medallions 804, 806, 808 mounted on a reel 802. A different reel symbol (which can be a blank symbol) is disposed on either side of each symbol medallion. Each symbol medallion 804, 806, 808 is pivotally mounted through any variety of mounting means. For example, the symbol medallion can be held in tension, and a solenoid engages or disengages a retracting member that causes the medallion to rotate (as shown in FIG. 8B) and flip over. Or, magnets may be disposed relative to the symbol medallion and the reel 802 whose polarity is reversed under programmed control of a controller, such as the controller 34, causing the medallion to flip over. Alternatively, a gear-and-motor assembly, such as shown in FIG. 3A, may be coupled to the symbol medallion to rotate it from one side to another. For added effect, the symbol medallion 806 can be made to spin, even after the reel 802 has stopped spinning, and come to rest after a predetermined period of time to display its symbol to the player after other symbols are known. A deceleration profile can be stored in a memory, such as the system memory 36, to decelerate the spinning medallion 806, thereby enhancing the anticipation in the player as to which side the medallion 806 will come to rest.

Figure 9:
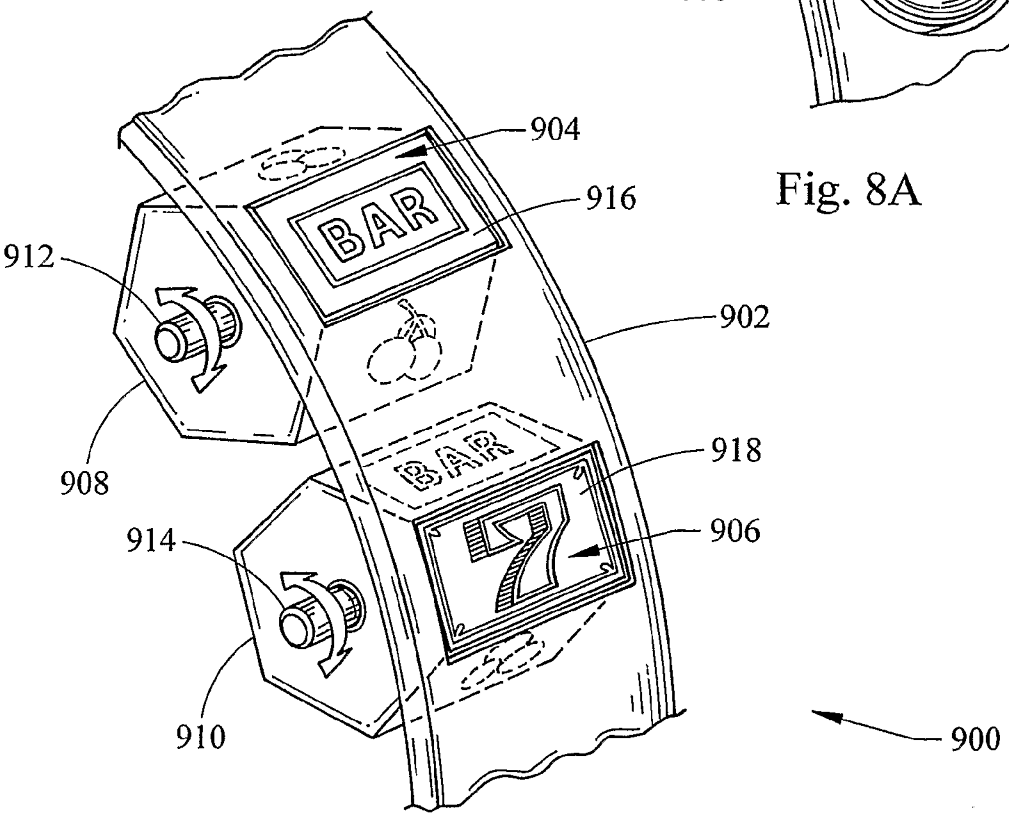
FIG. 9 is a perspective illustration of a reel system including a multi-sided symbol member having different symbols disposed on each side according to an aspect of the present invention.

FIG. 9 illustrates how six different symbols can be displayed at one symbol location, versus three symbols (FIG. 3A) and two symbols (FIG. 8A), in an alterable reel system 900 according to an embodiment of the present invention. Two multi-sided symbol members 908, 910 are shown, each having six surfaces on which reel symbols 916, 918 are disposed, pivotally mounted to a reel 902 via respective pivoting knobs 912, 914. Windows 904, 906 with optional transmissive LCDs positioned thereover are provided on the reel 902 to allow a surface of the multi-sided symbol members to be viewed therethrough. Rotation of the multi-sided symbol members 908, 910 is carried out under programmed control of the controller 34, and each symbol member 908, 910 may be rotated independently of the others or all symbol members 908, 910 may be rotated together. A gear system may be coupled to the symbol members 908, 910 in a manner like that shown and described in connection with FIGS. 3A-3C. Any surface of the multi-sided symbol members 908, 910 may contain a blank symbol. When a transmissive LCD is positioned over the windows 904, 906, the blank space beneath helps to accentuate the image or graphic displayed on the transmissive LCD during, for example, a video bonus game played on the transmissive LCD.

The pivoting knobs 912, 914 may be rotated using a gear-and-motor assembly like the one shown in FIG. 3A coupled to the knobs 912, 914. Alternately, magnets or retractable pins under control of a solenoid may be coupled to the multi-sided symbol members 908, 910 to cause rotation thereof.

Although six-sided symbol members are shown in FIG. 9, the present invention contemplates other shapes, such as four- or five-sided symbol members. Like the pivoting segments 308 shown in FIGS. 3A-3C, the multi-sided symbol members may be fabricated from a translucent white extrusion to permit light from a light source to be diffused through the material.

Each of these embodiments and obvious variations thereof is contemplated as falling within the spirit and scope of the claimed invention, which is set forth in the following claims.

What is claimed is:

1. A gaming machine for conducting a wagering game, the gaming machine comprising:

a dual-stage reel-strip system having a retracted position and an extended position, the system in said retracted position displaying a first set of reel symbols arranged circumferentially about a central axis, said system in said extended position displaying a second set of symbols arranged circumferentially on a retractable structure disposed about at least part of an outer periphery of said system, said retractable structure displaying said second set of reel symbols in place of one or more of the first set of symbols when said retractable structure moves in a direction parallel to said central axis to extend across said outer periphery.

2. The gaming machine of claim 1, wherein said retractable structure is disposed adjacent to said first set of symbols along said direction parallel to said central axis, and said one or more of said first set of symbols are axially displaced by said second set of symbols when said retractable structure is extended across said outer periphery.

* * * * *